(12) United States Patent
Jin et al.

(10) Patent No.: US 10,825,183 B2
(45) Date of Patent: Nov. 3, 2020

(54) ANALYZING AND PROCESSING METHOD AND DEVICE FOR A ROAD

(71) Applicant: BOE TECHNOLOGY GROUP CO., LTD., Beijing (CN)

(72) Inventors: Hailan Jin, Beijing (CN); Yang Han, Beijing (CN); Hui Du, Beijing (CN); Qi Yang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 165 days.

(21) Appl. No.: 16/107,928

(22) Filed: Aug. 21, 2018

(65) Prior Publication Data

US 2019/0096067 A1    Mar. 28, 2019

(30) Foreign Application Priority Data

Sep. 26, 2017   (CN) .......................... 2017 1 0884602

(51) Int. Cl.
*G06T 7/149* (2017.01)
*G06K 9/00* (2006.01)
*G06T 7/11* (2017.01)
*G06T 7/12* (2017.01)
*G06T 7/64* (2017.01)
*G06T 7/13* (2017.01)

(52) U.S. Cl.
CPC ............... *G06T 7/149* (2017.01); *G06K 9/00* (2013.01); *G06K 9/00664* (2013.01); *G06K 9/00791* (2013.01); *G06T 7/11* (2017.01); *G06T 7/12* (2017.01); *G06T 7/13* (2017.01); *G06T 7/64* (2017.01); *G06T 2207/20081* (2013.01); *G06T 2207/30184* (2013.01); *G06T 2207/30188* (2013.01)

(58) Field of Classification Search
USPC ................................ 382/100, 104, 108, 155
See application file for complete search history.

(56) References Cited

U.S. PATENT DOCUMENTS

| | | | | |
|---|---|---|---|---|
| 8,229,169 | B2 * | 7/2012 | Nakamura | G01C 21/26 382/104 |
| 8,428,305 | B2 * | 4/2013 | Zhang | B60W 30/00 382/103 |
| 8,803,966 | B2 * | 8/2014 | Zhang | G06K 9/00798 348/119 |

(Continued)

FOREIGN PATENT DOCUMENTS

| | | |
|---|---|---|
| CN | 1209008 A | 7/2005 |
| CN | 1209008 C | 7/2005 |

(Continued)

*Primary Examiner* — Ishrat I Sherali
(74) *Attorney, Agent, or Firm* — Foley & Lardner LLP

(57) ABSTRACT

The present disclosure provides an analyzing and processing method and device for a road. In the analyzing and processing method for a road provided by the present disclosure, a slope value of a ground surface is obtained and image data of the ground surface is collected, and then the image data is analyzed and processed by using a pre-trained landform analysis model, so as to determine a landform type corresponding to the image data. A traveling condition is then determined based on the slope value of the ground surface and the landform type, and command information is generated according to the traveling conditions.

13 Claims, 5 Drawing Sheets

(56) References Cited

U.S. PATENT DOCUMENTS

| | | | | |
|---|---|---|---|---|
| 2013/0079990 A1* | 3/2013 | Fritsch | ................... | B62D 6/007 |
| | | | | 701/41 |
| 2015/0178572 A1* | 6/2015 | Omer | ................... | G08G 1/0112 |
| | | | | 382/108 |
| 2017/0010115 A1* | 1/2017 | Stein | .................... | G05D 1/0221 |
| 2018/0025235 A1* | 1/2018 | Fridman | ................ | G01C 21/28 |
| | | | | 382/103 |
| 2018/0082501 A1* | 3/2018 | Kochhar | ................ | H04L 67/18 |
| 2018/0164812 A1* | 6/2018 | Oh | ..................... | G06K 9/00791 |
| 2019/0178989 A1* | 6/2019 | Tsai | ........................ | G01S 17/42 |

FOREIGN PATENT DOCUMENTS

| | | | | |
|---|---|---|---|---|
| CN | 104523282 A | | 4/2015 | |
| CN | 106997207 | * | 1/2016 | ............... G05D 1/02 |
| KR | 20180068511 | * | 12/2016 | ............. G05D 1/008 |
| KR | 20180063803 | * | 7/2017 | ............. A42B 3/042 |

* cited by examiner

ANALYZING AND PROCESSING METHOD AND DEVICE FOR A ROAD

CROSS REFERENCE TO RELATED APPLICATIONS

This application claims the benefit of Chinese Patent Application No. 201710884602.1, entitled "analyzing and processing method and device for a road" filed with the Chinese Patent Office on Sep. 26, 2017, the entire content of which is hereby incorporated by reference.

TECHNICAL FIELD

The present disclosure relates to the field of data analysis technology, and more particularly, to an analyzing and processing method for a road and an analyzing and processing device for a road.

BACKGROUND

Horse riding is a kind of sport that is good for physical and mental health, it is challenging, and is also a little bit dangerous. For example, for the judgment of a traveling condition, there is a risk of a subjective mistake of a rider, so that a command given by the rider to a horse may not be appropriate for the current traveling condition. For example, when riding in woodland, the rider should ride the horse slowly or dismount from the horse and lead the horse. If the rider lacks the experience of judging the travelling condition, and rides the horse fast without any prompt, it will be dangerous. Especially for a beginner, he/she has no experience in judging the traveling condition, this leads to increased risk. However, there is no effective technical means in the prior art to help the rider to accurately determine the traveling condition so as to ensure the safety of the rider.

Therefore, the technical problem that needs to be solved at present is how to accurately recognize the traveling condition when riding, so as to reduce the danger of the rider.

SUMMARY

On the one hand, there is provided an analyzing and processing method for a road, including:
  obtaining a slope value of a ground surface and collecting image data of the ground surface;
  analyzing and processing the image data by using a pre-trained landform analysis model, to determine a landform type corresponding to the image data;
  determining a traveling condition according to the slope value of the ground surface and the landform type. The traveling condition includes a traveling condition suitable for running a horse, a traveling condition suitable for riding the horse slowly, and a traveling condition suitable for dismounting from the horse and leading the horse; and
  generating command information according to the traveling condition. The command information is configured to adjust a movement status of the horse.

In an exemplary arrangement, determining a traveling condition according to the slope value of the ground surface and the landform type includes: determining a slope type of the ground surface according to the slope value, the slope type including downhill, flat road and uphill; and determining the traveling condition according to the slope type and the landform type.

In an exemplary arrangement, the determining a slope type of the ground surface according to the slope value includes: determining that the slope type of the ground surface is downhill, when the slope value is less than a first threshold slope; and determining that the slope type of the ground surface is flat road, when the slope value is greater than or equal to the first threshold slope, and less than or equal to a second threshold slope; and determining that the slope type of the ground surface is uphill, when the slope value is greater than the second threshold slope.

In an exemplary arrangement, the determining the traveling condition according to the slope type and the landform type includes: determining that the traveling condition is suitable for dismounting from the horse and leading the horse, when the slope type is downhill; determining that the traveling condition is suitable for riding the horse slowly, when the slope type is uphill; determining that the travelling condition is suitable for running the horse, when the slope type is flat road and the landform type is grassland or sand land; and determining that the traveling condition is suitable for riding the horse slowly, when the slope type is flat road, and the landform type is not grassland or sand land.

In an exemplary arrangement, generating command information according to the traveling condition includes: displaying an indicator lamp having a corresponding color according to the traveling condition, to prompt the rider to adjust the movement status of the horse; and/or issuing a standard voice command to the horse by a speaker, and/or applying an electric stimulus command to the horse to adjust the movement status of the horse, according to the traveling condition.

In an exemplary arrangement, before the command information is generated according to the traveling condition, the method further includes: collecting a human command given by the rider to the horse, the human command includes a human voice command, and the human voice command includes a standard voice command and a non-standard voice command; generating command information according to the traveling condition includes: when the human voice command is the non-standard voice command, and the human voice command is appropriate for the traveling condition, transforming the non-standard voice command into the standard voice command having the same meaning by using a pre-trained voice understanding model, and playing the standard voice command by a speaker; when the human voice command is the standard voice command, and the human voice command is not appropriate for the traveling condition, regenerating command information appropriate for the traveling condition according to the traveling condition.

In an exemplary arrangement, obtaining a slope value of a ground surface includes: determining the slope value of the ground surface according to a distance between the image collector and the ground surface; or determining the slope value of the ground surface according to acceleration of the image collector in a direction perpendicular to the ground surface. The image collector is provided on a helmet of a rider and faces a moving direction.

In an exemplary arrangement, training the pre-trained landform analysis model includes: selecting a set of image data containing a landform type label as a training sample; using an edge-based image segmentation method to segment the image data in the training sample into the sky and the earth; using a region-based image segmentation method to divide the earth in the image data into a plurality of regions; extracting texture information of each of the plurality of regions to determine the landform type; and establishing a correspondence relationship between the image data and the landform type by machine learning.

In some arrangements, there is also provided an analyzing and processing device for a road, applied to horse riding, the device being provided on a helmet of a rider, and including:

a data obtaining module configured to obtain a slope value of a ground surface and collect image data of the ground surface;

an analysis and processing module configured to analyze and process the image data by using a pre-trained landform analysis model, to determine a landform type corresponding to the image data;

a road condition recognition module configured to determine a traveling condition according to the slope value of the ground surface and the landform type, the traveling condition including a traveling condition suitable for running a horse, a traveling condition suitable for riding the horse slowly, and a traveling condition suitable for dismounting from the horse and leading the horse; and a main control module configured to generate command information according to the traveling condition. The command information is configured to adjust a movement status of the horse.

In some arrangements, a system for analyzing and processing a road, applied to horse riding, including a helmet, a speaker, and an electric stimulus device.

The helmet is configured to be worn on the head of a rider. The speaker and the electric stimulus device are configured to be disposed on the body of a horse.

The helmet includes an image collector, a pickup, and an information processing device.

The image collector is configured to obtain a slope value of a ground surface and collect image data of the ground surface.

The pickup is configured to receive a human voice command given by the rider.

The information processing device is configured to analyze and process the image data by using a pre-trained landform analysis model, to determine a landform type corresponding to the image data, and determine a traveling condition according to the slope value of the ground surface and the landform type, generate command information according to the traveling condition. The command information comprises a standard voice command and an electric stimulus command for adjusting a movement status of the horse.

The speaker is configured to perform the standard voice command on the horse.

The electric stimulus device is configured to execute the electric stimulus command on horse.

The image collector, the pickup, the speaker, and the electric stimulus device are all in communication connection with the information processing device.

DETAILED DESCRIPTION

In order to make the above objects, features, and advantages of the present disclosure more apparent and easier to understand, the present disclosure will be further described in detail in conjunction with the accompanying drawings and specific arrangements.

In the description of the present disclosure, the meaning of "a plurality of" represents two or more unless otherwise specified; orientations or positional relationships denoted by terms "up", "down", "left", and "right", "inside", and "outside" etc., are orientations or positional relationships shown based on the drawings and are merely for convenience of describing the present disclosure and simplifying the description of the present disclosure, rather than indicating or implying that the referred machine or element must have a specific orientation, or constructed and operated in a specific orientation, therefore shall not be construed as limiting the present disclosure.

In the description of the present disclosure, it should be noted that terms "mounting", "connecting", and "connection" should be understood in a broad sense unless specifically defined or specified, for example, they may be fixed connections, detachable connections, integral connections, mechanical connection, electrical connection, direct connections, or indirect connections through an intervening medium. For a person of ordinary skill in the art, the specific meanings of the above terms in the present disclosure can be understood in specific cases.

The specific arrangements of the present disclosure will be further described in detail below with reference to the accompanying drawings and arrangements. The following examples are intended to illustrate the present disclosure but are not intended to limit the scope of the present disclosure.

Figure 1:
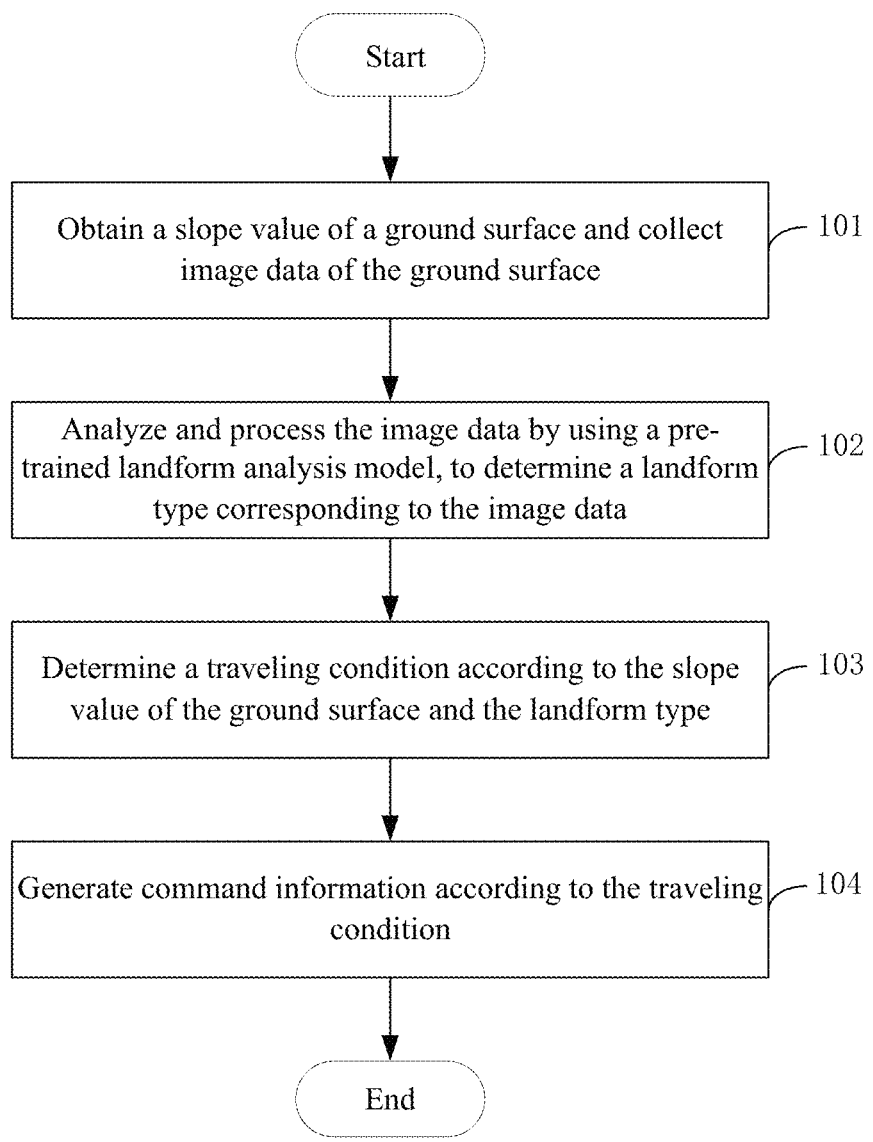
FIG. 1 is a flowchart showing an analyzing and processing method for a road according to an arrangement of the present disclosure.

FIG. 1 is a flowchart showing an analyzing and processing method for a road according to an arrangement of the present disclosure. As shown in FIG. 1, the method is applied to horse riding and includes the following blocks.

In 101, a slope value of a ground surface is obtained, and image data of the ground surface is collected.

During the horse riding, an image collector provided on a helmet of a rider may be used to obtain the slope value of the ground surface and collect the image data of the ground surface.

Specifically, since a depth camera has a function of distance measurement, the slope value of the ground surface can be automatically calculated from a distance between the image collector and the ground surface, which is measured by the depth camera, and a corresponding relationship between the distance and the slope value, which is built in advance. In practical applications, a slope value of a certain geographical coordinate position can be directly obtained by using a variety of map apps. In addition to the obtaining of the slope value of the ground surface, in order to analyze and determine a landform type of the road ahead, the image data of the ground surface may also be collected by the image collector.

In 102, the image data is analyzed and processed by using a pre-trained landform analysis model, to determine a landform type corresponding to the image data.

Different landform types have different effects on the safety of the horse riding. In order to accurately determine a traveling condition of the road ahead, after the image data of the ground surface is collected, the image data can be analyzed and processed by a pre-trained landform analysis mode, to determine a landform type corresponding to the image data.

Specifically, when the landform analysis model is trained in advance, a set of image data including landform type labels may be selected as a training sample. An edge-based image segmentation method is used to segment the image data in the training sample into the sky and the earth. Then, a region-based image segmentation method is used to divide the earth in the image data into a plurality of regions. After the plurality of regions are obtained by segmenting the earth, texture information of each of the plurality of regions may be extracted to determine the landform type. A correspondence relationship between the image data and the landform types is then established through machine learning. Therefore, the pre-trained landform analysis model can accurately determine the landform type of the road ahead according to the collected image data, so as to accurately determine the traveling condition.

In 103, the traveling condition is determined according to the slope value of the ground surface and the landform type.

After the slope value of the ground surface and the landform type are obtained, a slope type of the ground surface can be determined according to the slope value, and then the traveling condition can be determined according to the slope type and the landform type. The slope type includes downhill, flat road and uphill. The traveling condition includes a traveling condition suitable for running a horse, a traveling condition suitable for riding slowly, and a traveling condition suitable for dismounting from the horse and leading the horse.

Specifically, the slope type of the ground surface may be determined by comparing the slope value of the ground surface with a first threshold slope and a second threshold slope which are set in advance. Different slope types correspond to different traveling conditions, respectively. When the slope types are the same, but the landform types are different, the travelling conditions will be different. For example, when the slope type is downhill, it can be determined that the travelling condition is suitable for dismounting from the horse and leading the horse; when the slope type is uphill, it can be determined that the travelling condition is suitable for riding slowly; when the slope type is flat road, and the landform type is grassland or sand land, it can be determined that the travelling condition is suitable for running the horse; and when the slope type is the flat road and the landform type is not the grassland or the sand land, it can be determined that the travelling condition is suitable for riding slowly.

In 104, command information is generated according to the traveling condition.

Specifically, in order to make the command information appropriate for the traveling condition, an indicator lamp having a corresponding color may be displayed according to the traveling condition to prompt the rider to adjust a movement status of the horse. Additionally/alternatively, according to the traveling condition, a standard voice command is issued to the horse through a speaker, and/or an electric stimulus command is applied to the horse, so as to adjust the movement status of the horse. The standard voice command includes "giddyap" and "Ho". For example, colors of the indicator lamp may include red, yellow, and green. Red indicates that the traveling condition of the road ahead is suitable for dismounting from the horse and leading the horse, yellow indicates that the traveling condition of the road ahead is suitable for riding slowly, and green indicates that the traveling condition of the road ahead is suitable for running the horse. The traveling condition suitable for running the horse only indicates that the travelling condition of the road ahead is good, the rider can run the horse, but it is not limited to running the horse. The slower, the safer, from this point, commands for slowing down or stopping the horse, such as, the standard voice command "Ho" given to the horse, are regarded as command information that is appropriate for the travelling condition.

In summary, in the analyzing and processing method for a road provided by the arrangement of the present disclosure, the slope value of the ground surface is obtained and the image data of the ground surface is collected, and then the image data is analyzed and processed by using the pre-trained landform analysis model, so as to determine the landform type corresponding to the image data. The traveling condition is then determined based on the slope value of the ground surface and the landform type, and command information is generated according to the traveling conditions. In this way, accuracy of recognition of the traveling condition can be greatly improved, and the movement status of the horse can be effectively adjusted so that the movement status of the horse conforms to the current traveling condition, therefore enhancing the safety of the horse riding.

Figure 2:
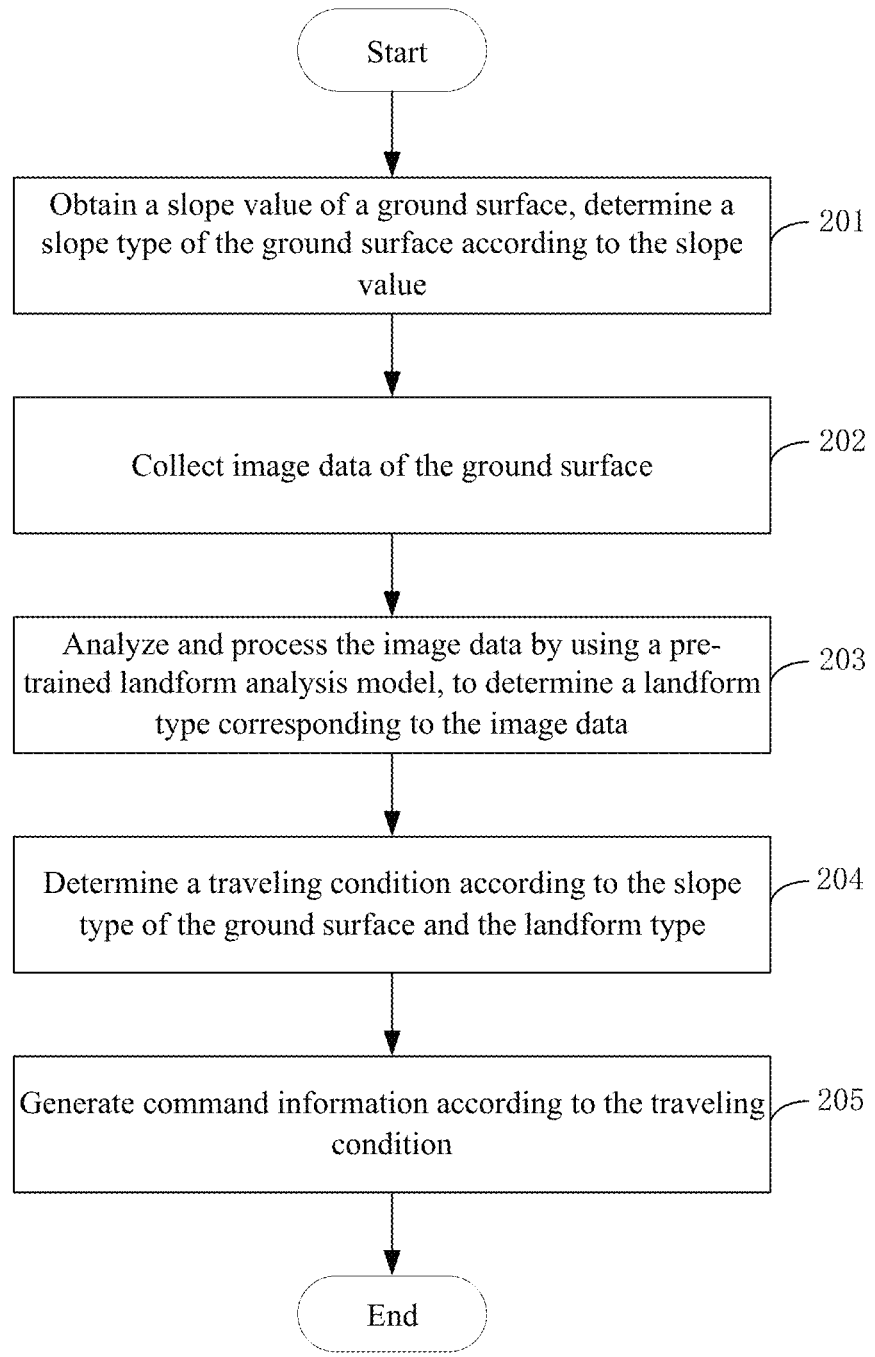
FIG. 2 is a flowchart sowing another analyzing and processing method for a road according to an arrangement of the present disclosure.

FIG. 2 is a flowchart showing another analyzing and processing method for a road according to an arrangement of the present disclosure. As shown in FIG. 2, the method is applied to horse riding, and includes the following blocks.

In 201, a slope value of a ground surface is obtained, and a slope type of the ground surface is determined according to the slope value.

During the horse riding, the slope value of the ground surface has a great influence on the safety of the horse riding. Moreover, different slope types have different effects on the safety. For example, when the slope type of the ground surface is uphill, a rider can ride a horse slowly, if the rider forces the horse to run, it might be dangerous. When the slope type of the ground surface is downhill, even if riding the horse slowly, it might also be dangerous. Therefore, after the slope value of the ground surface is obtained, the slope type of the ground surface may be determined according to the slope value.

Specifically, when the slope value of the ground surface is obtained, the slope value of the ground surface may be determined according to a distance between an image collector and the ground surface, and the slope value of the ground surface may also be determined according to acceleration of the image collector in a direction perpendicular to the ground surface. The image collector can be disposed on a helmet of the rider and face a moving direction.

In practical applications, the image collector may be a depth camera with a distance measurement function, so that the distance between the image collector and the ground surface may be obtained by the distance measurement function, and then the slope value of the ground surface is determined according to the distance between the image collector and the ground surface. The principle of measuring the distance by the depth camera is to calculate a distance from a target point to an imaging plane by simulating a parallax of human eyes. That is, binocular matching is carried out by using a dual camera to obtain a parallax in an image of the target point in left and right views. Each camera can obtain an image of one view, respectively. Since the parallax is inversely proportional to the distance from the target point to the imaging plane, the distance from the target point to the imaging plane is calculated based on the parallax, when a point on the ground surface is selected as the target point, the calculated distance is the distance from the image collector to the ground surface. After the distance between the image collector and the ground surface is measured, the slope value of the ground surface can be determined according to the change law of the distance between the image collector and the ground surface when riding on the ground surface of different slope types. Specifically, an angle at which the image collector collects the image data may be a constant angle. Therefore, when traveling uphill, the image collector is usually at a short distance from the ground surface, and when traveling downhill, the image collector is usually at a far distance from the ground surface. Therefore, a corresponding relationship between the distance and the slope value may be established in advance, and the slope value of the ground surface may be determined according to the corresponding relationship and the measured distance. In practical applications, an acceleration sensor may also be used to obtain acceleration of the image collector in a direction perpendicular to the ground surface, and the slope value of the ground surface may be determined according to the acceleration. Alternatively, the slope value of the ground surface at a corresponding coordinate position is directly provided by using a variety of map apps.

After the slope value of the ground surface is obtained, since the value of the slope having a small angle usually does not affect the horse riding, an interval range of the slope value can be set, and when the slope value of the ground surface is within the interval range, the road is regarded as flat road. Specifically, it may be set in such a manner that when the slope value is less than a first threshold slope, the slope type of the ground surface is determined as downhill; when the slope value is greater than or equal to the first threshold slope, and less than or equal to a second threshold slope, the slope type of the ground surface is determined as flat road; and when the slope value is greater than the second threshold slope, the slope type of the ground surface is determined as uphill. For example, the first threshold slope may be $-x°$, and the second threshold slope may be $x°$. When the slope of the ground surface is less than $-x°$, it can be determined that the type of the slope of the ground surface is downhill, and when the slope of the ground surface is greater than $x°$, it can be determined that the slope type of the ground surface is uphill.

In 202, the image data of the ground surface is collected.

The safety of the horse riding is not only affected by the slope of the ground, but also influenced by the landform type. For example, even if the slope type of the ground surface is flat road, but the landform type is not a landform type suitable for running, such as grassland and sand land, if running the horse, it might be dangerous. Therefore, in order to accurately determine the traveling condition, the image data of the ground surface may be collected, and the image data may be analyzed and processed to determine the landform type. Therefore, by analyzing the slope value of the ground surface and the landform type, the traveling condition can be determined more accurately, so as to help the rider to ride the horse in a proper appropriate way and effectively reduce the danger of horse riding. Specifically, the image data of the ground surface in front of the horse can be collected by an image collector provided on the helmet of the rider.

In 203, the image data is analyzed and processed by using a pre-trained landform analysis model, to determine a landform type corresponding to the image data.

The landform analysis model can be pre-trained in the following blocks.

In block A, a set of image data containing a landform type label is selected as a training sample.

Specifically, a set of image data containing abundant landform types may be selected as a training sample. Each landform type is marked with a label, and each image data may include at least one of landform types such as grassland, sand land, forest land, bushes, and snow field.

In block B, an edge-based image segmentation method is used to divide the image data in the training sample into the sky and the earth.

Specifically, image segmentation based on edge detection is a segmentation method that employs general properties of relatively dramatic edge gray level transformation of a target object in an image and extracts a region where the target object is located by utilizing an edge detection method in image processing. That is, the boundary between the sky and the earth is detected by employing different properties among different image regions. For example, the image data in the training sample is divided into to the section of the sky and the section of the earth by using gray level discontinuity at edges of the regions. Because of the dramatic edge gray level transformation between the sky and the earth, the image data can be accurately divided into image data related to the sky and image data related to the earth.

In block C, the earth in the image data is segmented into a plurality of regions by using a region-based image segmentation method.

Specifically, when the earth of the image data is segmented into a plurality of regions by using a region-based image segmentation method, a support vector machine algorithm may be used to segment the image. The support vector machine algorithm is a kind of classification algorithm, which can improve generalization ability of a learning machine by minimizing the structuring risk, and realize the minimization of the empirical risk and confidence range, so as to achieve good statistical rules in a case where there are less statistical samples. The support vector machine algorithm can be finally transformed into a solution to a convex quadratic programming problem, in this way, the earth in the image data can be accurately segmented into a plurality of regions.

In block D, texture information of each of the plurality of regions is extracted to determine the landform type.

Specifically, because different texture features respectively correspond to different types of landforms, after the texture information of each of the plurality of regions is extracted, the landform type corresponding to each of the regions may be determined accordingly.

In block E, a correspondence relationship between the image data and the landform type is established by machine learning.

Specifically, after performing machine learning with a great number of training samples, an accurate correspondence relationship between the image data and the landform type can be established.

When the pre-trained landform analysis model is used to analyze and process the image data, the landform type corresponding to the collected image data can be accurately analyzed according to the corresponding relationship.

In 204, the traveling condition is determined according to the slope type of the ground surface and the landform type.

After determining the slope type of the ground surface and the landform type, the traveling condition of the road ahead can be determined by one or a combination of the slope type of the ground surface and landform type.

Specifically, when the slope type is downhill, it can be determined that the traveling condition is suitable for dismounting from the horse and leading the horse, and even if the landform type is grassland or sand land, the rider should dismount from the horse and lead the horse from the viewpoint of ensuring the safety of the horse riding. When the slope type is uphill, it can be determined that the travelling condition is suitable for riding the horse slowly. In practical applications, when the slope type is uphill and the landform type is not grassland or sand land, that is, when the rider is facing dual risk factor, in order to guarantee the safety of the horse riding, it can be determined that the travelling condition is dismounting from the horse and leading the horse. When the slope type is flat road and the landform type is grassland or sand land, it can be determined that the travelling condition is suitable for running the horse; and when the slope type is flat road, but the landform type is not grassland or sand land, it is determined that the travelling condition is suitable for riding the horse slowly. All kinds of traveling conditions refer to the ways to ride the horse that are taken on the premise of ensuring the safety of horse riding. Under a variety of slope types and landform types, riding the horse slowly is safer than riding the horse fast, and dismounting from the horse and leading the horse is safer than riding the horse slowly.

In 205, command information is generated according to the traveling condition.

Specifically, an indicator lamp having a corresponding color is displayed according to the traveling condition to prompt the rider to adjust a movement status of the horse. Additionally/alternatively, according to the traveling condition, a standard voice command is issued to the horse through a speaker, and/or an electric stimulus command is applied to the horse, so as to adjust the movement status of the horse. For example, an electric stimulus device may be provided on horsecloths. Applying an electric stimulus to different body parts of the horse at different frequencies can correspond to different commands respectively. For example, applying the electric stimulus to the body parts on the left side of the horse can make the horse turn left, and applying the electric stimulus to the body parts on the right side of the horse can make the horse turn right. Applying the electric stimulus to the horse's reins can stop the horse. A moving speed of the horse can be controlled by controlling frequency and intensity of the electric stimulus.

In practical applications, a human command given to the horse by the rider may not be standard such that the horse cannot recognize the command, or the command may not be appropriate for the travelling condition of the road ahead, resulting in an increase in the danger of horse riding. Therefore, before the command information is generated according to the traveling condition, the human command given by the rider to the horse may be collected. The human command includes a human voice command. After the human voice command is collected, the human voice command may be processed to obtain command information that is appropriate for the traveling condition, and then the movement status of the horse is controlled by using the command information that is appropriate for the traveling condition, to further ensure the safety of the horse riding.

Specifically, the human voice command can be further classified into a standard voice command and a non-standard voice command. For example, when it needs to slow down or even stop the horse, the standard voice command is "Ho", but the rider might use the non-standard voice command, for example, such as, "stop!" "I said to stay!" and so on. This non-standard voice command is difficult to be recognized by the horse, and there will be a problem that the command is invalid. Therefore, the human voice command can be processed in the following manners.

When the human voice command is a non-standard voice command, and the human voice command is appropriate for the traveling condition, the pre-trained voice understanding model is adopted to change the non-standard voice command to a standard voice command having the same meaning, and the standard voice command is played through the speaker. In practical applications, the standard voice commands are usually "giddyap" and "Ho". "giddyap" is used to urge the horse to run, and "Ho" is to stop the horse. Therefore, the non-standard voice command whose meaning is related to "run" can be transformed into "giddyap", and the non-standard voice command meaning of which is related to "stop" can be transformed into "Ho", so as to effectively control the horse.

When the human voice command is a standard voice command, but the human voice command is not appropriate for the traveling condition, command information appropriate for the traveling condition is regenerated according to the traveling condition. That is, when the rider gives the standard voice command "giddyap" to the horse under the travelling condition in which the horse should not speed up, the danger of riding will be increased. In this case, the standard voice command "Ho" may be given to the horse, or an electric stimulus can be applied to a specific body part of the horse, so as to prevent the horse from speeding up.

In practical applications, when the human voice command is a non-standard voice command, and the human voice command is not appropriate for the traveling condition, the non-standard voice command may not be transformed so as to avoid adverse effects resulted from the non-standard voice command. When the human voice command is a standard voice command, and is appropriate for the traveling condition, no new command information needs to be generated.

To sum up, in the analyzing and processing method for a road provided by the arrangement of the present disclosure, the slope type of the ground surface is determined by obtaining the slope value of the ground surface. Moreover, the image data of the ground surface is collected to determine the landform type corresponding to the image data. According to the slope type of the ground surface and the landform type, the traveling condition is determined. And before the command information is generated, the human command given by the rider to the horse is collected. Therefore, the human command may be processed according to the traveling condition, to regenerate the command information, so as to enhance the human command that is appropriate for the traveling condition or canceling the human command that is not appropriate for the traveling condition. Thus, the effect of control of the horse by the rider can be embodied maximally on a road with a good travelling condition. The safety of the rider can be effectively guaranteed a road with an unfavorable travelling condition. Therefore, it can not only enhance the fun of riding, but also improve the safety of riding, and the user experience will be effectively improved.

Figure 3:
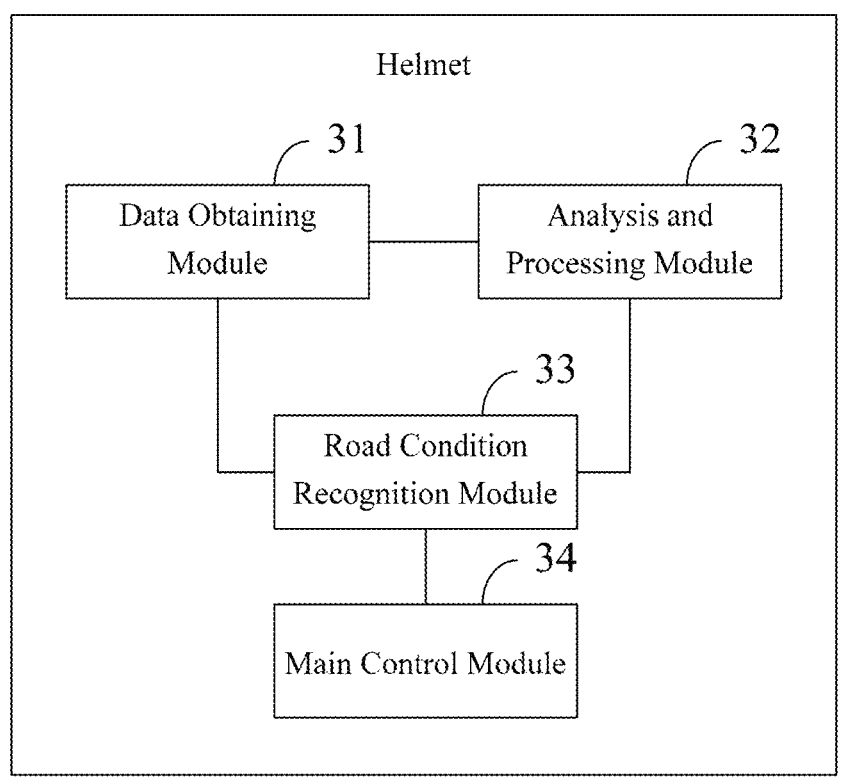
FIG. 3 is a structure diagram illustrating an analyzing and processing device for a road according to an arrangement of the present disclosure.

FIG. 3 is a structure diagram illustrating an analyzing and processing device for a road in an arrangement of the present disclosure. The device can be applied to horse riding. In practical applications, the device can be provided on a helmet of a rider, and includes a data obtaining module 31, an analysis and processing module 32, a road condition recognition module 33, and a main control module 34.

The data obtaining module 31 is configured to obtain a slope value of a ground surface and collect image data of the ground surface. The data obtaining module 31 may be an image collector including but not limited to a camera.

The analysis and processing module 32 is configured to analyze and process the image data by using a pre-trained landform analysis model, to determine a landform type corresponding to the image data. The analysis and processing module 32 may include but is not limited to a processor.

The road condition recognition module 33 is configured to determine a traveling condition according to the slope value of the ground surface and the landform type, The road condition recognition module 33 may include but is not limited to an information processor. The traveling condition includes a traveling condition suitable for running a horse, a traveling condition suitable for riding the horse slowly, and a traveling condition suitable for dismounting from the horse and leading the horse.

The main control module 34 is configured to generate command information according to the traveling condition. The command information is configured to adjust a movement status of the horse. The main control module 34 may include but is not limited to a chip.

The analyzing and processing device for a road can implement respective procedures of the arrangements of the analyzing and processing method for a road described above, and can achieve the same technical effect. To avoid repetition, the description will not be elaborated herein.

Figure 4:
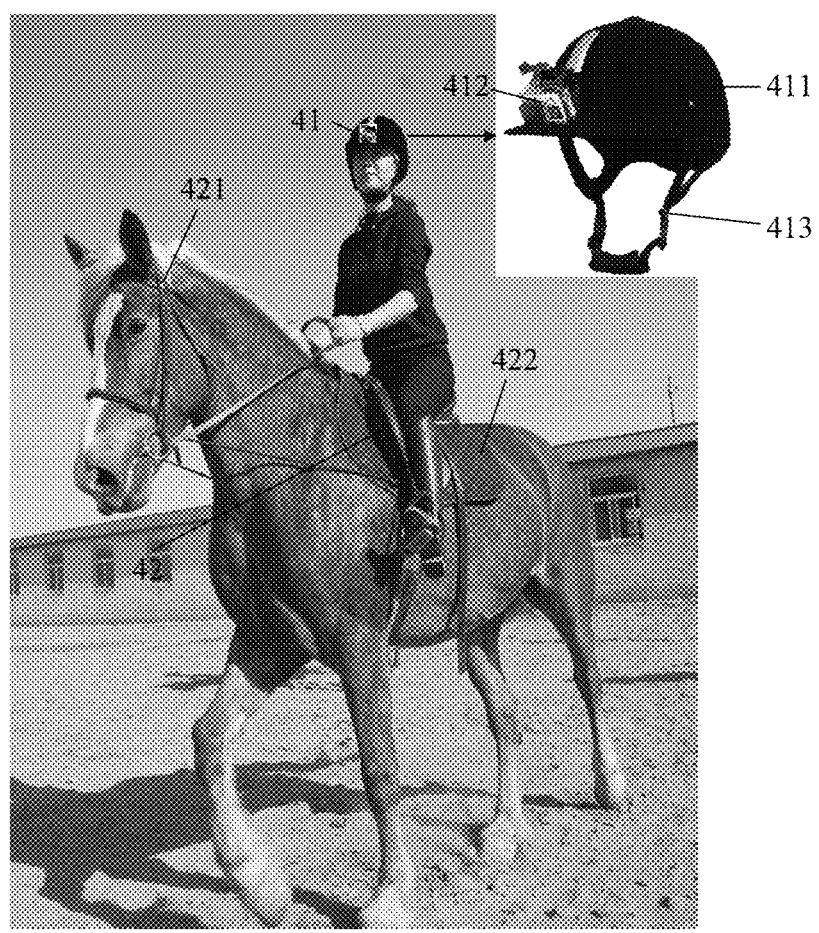
FIG. 4 is a structural schematic diagram illustrating a system for analyzing and processing a road according to an arrangement of the present disclosure.
Figure 5:
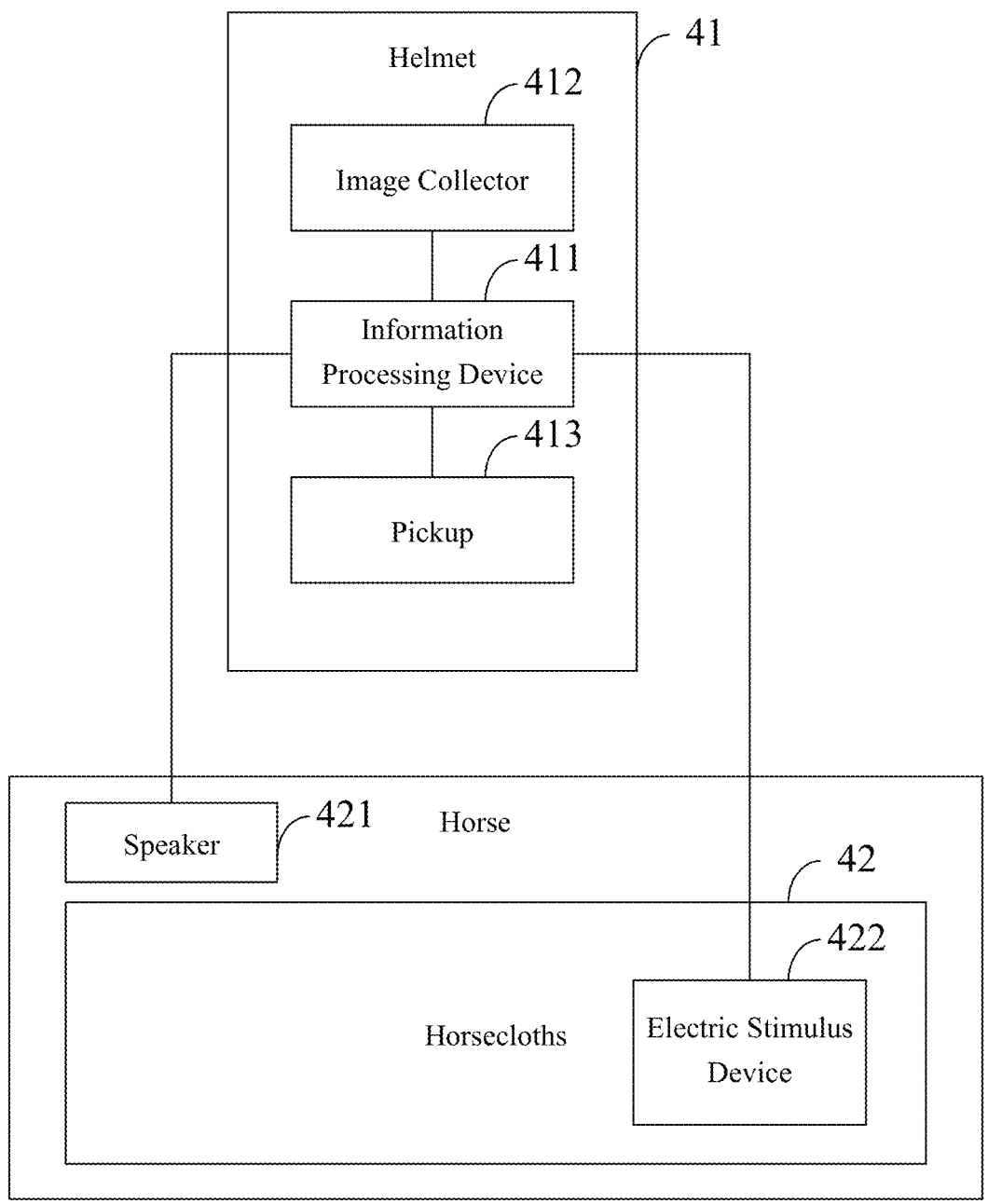
FIG. 5 is a structure diagram illustrating a system for analyzing and processing a road provided by an arrangement of the present disclosure.

FIG. 4 is a structural schematic diagram illustrating a system for analyzing and processing a road provided by an arrangement of the present disclosure. FIG. 5 is a structure diagram illustrating a system for analyzing and processing a road provided by an arrangement of the present disclosure. The system for analyzing and processing a road is applied to horse riding and includes a helmet 41, a speaker 421, and an electric stimulus device 422.

The helmet 41 can be worn on the head of a rider, and the speaker 421 and the electric stimulus device 422 are disposed on the body of a horse. In practical applications, the electric stimulus device 422 may be disposed on horsecloths 42, which is worn on the body of the horse, or the electric stimulus device 422 may be directly disposed on a saddle. The speaker 421 may be disposed close to a position of the ear of the horse. For example, the speaker 421 may be disposed on the reins of the head of the horse so that the horse can accurately receive the command information sent from the speaker 421.

Specifically, the helmet 41 includes an information processing device 411, an image collector 412, and a pickup 413. The image collector 412 is configured to obtain a slope value of a ground surface and collect image data of the ground surface. The pickup 413 is configured to receive a human voice command of the rider. The information processing device 411 is configured to analyze and process the image data by using a pre-trained landform analysis model, to determine a landform type corresponding to the image data, and determine a traveling condition according to the slope value of the ground surface and the landform type, generate command information according to the traveling condition. The command information includes a standard voice command and an electric stimulus command for adjusting a movement status of the horse.

After the command information is generated by the helmet 41, the speaker 421 may be used to perform the standard voice command on the horse. The electric stimulus device 422 may be used to execute the electric stimulus command on horse. Specifically, the image collector 412, the pickup 413, the speaker 421, and the electric stimulus device 422 are all in communication connection with the information processing device 411.

In summary, in the system for analyzing and processing a road provided by the arrangement of the present disclosure, the image collector 412 is configured to obtain the slope value of the ground surface and collect the image data of the ground surface. The information processing device 411 is configured to analyze and process the image data by using the pre-trained landform analysis model, to determine the landform type corresponding to the image data, and determine the traveling condition according to the slope value of the ground surface and the landform type, and then generate the command information according to the traveling condition. The speaker 421 and/or the electric stimulus device 422 apply the command information to the horse, so that the accuracy of recognition of the traveling condition is greatly improved, and the movement status of the horse can be effectively adjusted so that the movement status of the horse conforms to the current traveling condition, and the safety of horse riding is strengthened.

The respective arrangements in this specification is described in a progressive manner, and each of the arrangements focuses on differences thereof from the other arrangements, and the same or similar portions among the arrangements can be referred to each other.

The device and analyzing and processing method for a road provided by the present disclosure have been described above in detail. Specific examples are used herein to describe the principle and implementation manners of the present disclosure. The description of the arrangements above-mentioned is only used to help the understanding of the method and its core ideas of the present disclosure. Meanwhile, for those skilled in the art, based on the idea of the present disclosure, there will be changes in the specific implementation manners and application ranges. In summary, the contents of this specification shall not be understood as limitations to the present disclosure.

What is claimed is:

1. An analyzing and processing method for a road, comprising:
   obtaining a slope value of a ground surface and collecting image data of the ground surface;
   determining a landform type corresponding to the image data, wherein determining the landform type corresponding to the image data comprises analyzing and processing the image data by using a pre-trained landform analysis model, wherein training the pre-trained landform analysis model comprises:
   selecting a set of image data containing a landform type label as a training sample;
   using an edge-based image segmentation method to segment the image data in the training sample into sky and earth;
   using a region-based image segmentation method to divide the earth in the image data into a plurality of regions;
   extracting texture information of each of the plurality of regions to determine the landform type; and
   establishing a correspondence relationship between the image data and the landform type by machine learning;

determining a traveling condition according to the slope value of the ground surface and the landform type, wherein the traveling condition comprises a traveling condition suitable for running a horse, a traveling condition suitable for riding the horse slowly, and a traveling condition suitable for dismounting from the horse and leading the horse; and generating command information according to the traveling condition, wherein the command information is configured to adjust a movement status of the horse.

2. The method according to claim 1, wherein determining the traveling condition according to the slope value of the ground surface and the landform type comprises:

determining a slope type of the ground surface according to the slope value, wherein the slope type comprises downhill, flat road and uphill; and determining the traveling condition according to the slope type and the landform type.

3. The method according to claim 2, wherein the determining the slope type of the ground surface according to the slope value comprises:

determining that the slope type of the ground surface is downhill, when the slope value is less than a first threshold slope; and determining that the slope type of the ground surface is the flat road, when the slope value is greater than or equal to the first threshold slope, and less than or equal to a second threshold slope; and determining that the slope type of the ground surface is uphill, when the slope value is greater than the second threshold slope.

4. The method according to claim 2, wherein the determining the traveling condition according to the slope type and the landform type comprises:

determining that the traveling condition is suitable for dismounting from the horse and leading the horse, when the slope type is downhill;

determining that the traveling condition is suitable for riding the horse slowly, when the slope type is uphill;

determining that the travelling condition is suitable for running the horse, when the slope type is the flat road and the landform type is grassland or sand land; and determining that the traveling condition is suitable for riding the horse slowly, when the slope type is the flat road, and the landform type is not grassland or sand land.

5. The method according to claim 1, wherein generating the command information according to the traveling condition comprises:

displaying an indicator lamp having a corresponding color according to the traveling condition, to prompt a rider to adjust the movement status of the horse; and issuing a standard voice command to the horse by a speaker, and applying an electric stimulus command to the horse to adjust the movement status of the horse, according to the traveling condition.

6. The method according to claim 1, wherein generating the command information according to the traveling condition comprises:

displaying an indicator lamp having a corresponding color according to the traveling condition, to prompt a rider to adjust the movement status of the horse; and applying an electric stimulus command to the horse to adjust the movement status of the horse, according to the traveling condition.

7. The method according to claim 1, wherein generating the command information according to the traveling condition comprises:

issuing a standard voice command to the horse by a speaker, and applying an electric stimulus command to the horse to adjust the movement status of the horse, according to the traveling condition.

8. The method according to claim 1, wherein generating the command information according to the traveling condition comprises:

applying an electric stimulus command to the horse to adjust the movement status of the horse, according to the traveling condition.

9. The method according to claim 1, wherein before the command information is generated according to the traveling condition, the method further comprises: collecting a human command given by a rider to the horse, wherein the human command comprises a human voice command, and the human voice command comprises a standard voice command and a non-standard voice command;

generating the command information according to the traveling condition comprises:

when the human voice command is the non-standard voice command, and the human voice command is appropriate for the traveling condition, transforming the non-standard voice command into the standard voice command having the same meaning by using a pre-trained voice understanding model, and playing the standard voice command by a speaker;

when the human voice command is the standard voice command, and the human voice command is not appropriate for the traveling condition, regenerating command information appropriate for the traveling condition according to the traveling condition.

10. The method according to claim 1, wherein obtaining the slope value of the ground surface comprises:

determining the slope value of the ground surface according to a distance between an image collector and the ground surface; or determining the slope value of the ground surface according to acceleration of the image collector in a direction perpendicular to the ground surface;

wherein the image collector is provided on a helmet of a rider and is facing a moving direction.

11. The method according to claim 1, wherein obtaining the slope value of the ground surface comprises:

determining the slope value of the ground surface according to acceleration of a image collector in a direction perpendicular to the ground surface;

wherein the image collector is provided on a helmet of a rider and is facing a moving direction.

12. An analyzing and processing device for a road, applied to horse riding, the device being provided on a helmet of a rider, and comprising:

a data obtaining module comprising an image collector and configured to obtain a slope value of a ground surface and collect image data of the ground surface;

an analysis and processing module comprising a processor and configured to analyze and process the image data by using a pre-trained landform analysis model, to determine a landform type corresponding to the image data, wherein training the pre-trained landform analysis model comprises:

selecting a set of image data containing a landform type label as a training sample;

using an edge-based image segmentation method to segment the image data in the training sample into sky and earth;

using a region-based image segmentation method to divide the earth in the image data into a plurality of regions;

extracting texture information of each of the plurality of regions to determine the landform type; and establishing a correspondence relationship between the image data and the landform type by machine learning;

a road condition recognition module comprising an information processor configured to determine a traveling condition according to the slope value of the ground surface and the landform type, wherein the traveling condition comprises a traveling condition suitable for running a horse, a traveling condition suitable for riding the horse slowly, and a traveling condition suitable for dismounting from the horse and leading the horse; and a main control module comprising a computer chip and configured to generate command information according to the traveling condition, wherein the command information is configured to adjust a movement status of the horse.

13. An analyzing and processing system for a road, applied to horse riding, comprising a helmet, a speaker, and an electric stimulus device, wherein the helmet is worn on a head of a rider, and the speaker and the electric stimulus device are disposed on a body of a horse, the helmet comprises an image collector, a pickup, and an information processing device, the image collector is configured to obtain a slope value of a ground surface and collect image data of the ground surface, the pickup is configured to receive a human voice command given by the rider, the information processing device is configured to analyze and process the image data by using a pre-trained landform analysis model, to determine a landform type corresponding to the image data, and determine a traveling condition according to the slope value of the ground surface and the landform type, generate command information according to the traveling condition, wherein the command information comprises a standard voice command and an electric stimulus command for adjusting a movement status of the horse;

the speaker is configured to perform the standard voice command on the horse;

the electric stimulus device is configured to execute the electric stimulus command on horse; and the image collector, the pickup, the speaker, and the electric stimulus device are all in communication connection with the information processing device.

* * * * *